UNITED STATES PATENT OFFICE 2,548,435

OXIDATION OF AROMATIC HYDROCARBONS

Eugene J. Lorand and John E. Reese, Wilmington, Del., assignors to Hercules Powder Company, Wilmington, Del., a corporation of Delaware No Drawing. Application August 1, 1946,
Serial No. 687,705

25 Claims. (Cl. 260—610)

This invention relates to a process of oxidizing an alkyl-substituted aromatic organic compound having the structural formula

in which $R_1$ and $R_2$ represent alkyl groups and Ar represents a substituent selected from the group consisting of aryl and substituted aryl groups. More particularly, the invention relates to the oxidation of compounds such as p-cymene in the liquid phase by means of molecular oxygen.

It is known that p-cymene, for example, may be oxidized either in the liquid phase or the vapor phase by means of air or molecular oxygen to reaction products which may include p-toluic acid, terephthalic acid, p-methylacetophenone, cumic acid, cumaldehyde, $\alpha,\alpha$-dimethyl-p-methylbenzyl alcohol and p-methyl-$\alpha$-methyl styrene, the particular reaction products obtained being dependent upon whether a liquid phase or a vapor phase is utilized, the reaction temperature involved and the catalyst used. None of the processes heretofore disclosed, however, have been successful in effecting substantial yields of $\alpha,\alpha$-dimethyl-p-methylbenzyl hydroperoxide or of $\alpha,\alpha$-dimethyl-p-methylbenzyl alcohol, which are two of the most useful oxidation products of p-cymene. Under the conditions practiced in prior procedures, the yield of $\alpha,\alpha$-dimethyl-p-methylbenzyl alcohol has been low because of competitive side reactions, such as dehydration of this alcohol to p-methyl-$\alpha$-methyl styrene. Although the oxidation of p-cymene has been used as an example, similar undesirable side reactions occur in the oxidation of other alkyl-substituted aromatic organic compounds having the following structural formula

in which $R_1$ and $R_2$ represent alkyl groups and Ar represents a substituent selected from the group consisting of aryl and alkaryl groups. When Ar is an aryl, and in particular a phenyl, group, prior art processes have led to mixtures rich in ketones and low in alcohols. For example, the air oxidation of isopropylbenzene has predominantly yielded acetophenone and small amounts of $\alpha,\alpha$-dimethylbenzyl alcohol.

Now in accordance with this invention, it has been found that alkyl-substituted aromatic organic compounds having the above structural formula may be oxidized by passing an oxygen-containing gas through said compounds in the liquid phase at a temperature between about 20° C. and about 95° C. in the presence of an aqueous medium selected from the group consisting of liquid water and aqueous alkali, whereby there are produced substantial amounts of hydroxy or hydroperoxy derivatives having the structural formula $$\begin{array}{c} R_1 \diagdown \diagup X \\ C \\ \diagup \diagdown \\ R_2 \quad Ar \end{array}$$

in which $R_1$ and $R_2$ represent alkyl groups, Ar represents a substituent selected from the group consisting of aryl and alkaryl groups, and X represents a substituent selected from the group consisting of hydroxy (—OH) and hydroperoxy (—OOH) groups. The amount of hydroxy or hydroperoxy derivative in the oxidation product depends upon the manner in which the oxidation was effected.

In carrying out the process of this invention, cumene, for example, and liquid water or an aqueous solution of an alkali are agitated vigorously while a stream of air or oxygen is simultaneously blown through the reaction mixture. The reaction is carried out at a temperature between about 20° C. and about 95° C. until standard analytical data such as refractive index indicate the conversion of approximately 40–80% of the cumene. Utilizing known techniques, the reaction mixture then may be worked up to recover a reaction product containing substantial and preponderant amounts of $\alpha,\alpha$-dimethylbenzyl alcohol or of $\alpha,\alpha$-dimethylbenzyl hydroperoxide, depending upon the exact conditions used.

Now having generally outlined the embodiments of this invention, the following examples constitute specific illustrations. All amounts are based on parts by weight.

Example 1

Four hundred two parts of p-cymene of 99% purity (refractive index at 20° C., 1.4910) and 450 parts of water in which 8 parts of potassium permanganate had been dissolved were placed in a closed reaction vessel equipped with a reflux condenser, a gas inlet tube leading to the bottom of the reaction vessel, and an efficient high speed agitator. Through the inlet tube a strong current of air was introduced under the agitator blades so that a fine dispersion of the three phases resulted. The progress of the reaction was checked by taking samples at intervals and determining their refractive index. When the latter reached the value of 1.5181 (20° C.) the reaction was terminated.

The reaction mixture separated into an oily and an aqueous layer. After removing the latter, the oily layer was extracted several times with a 2% solution of sodium carbonate and finally with sodium hydroxide of the same concentration. The alkaline extractions were combined and then acidified with sulfuric acid to precipitate 59.7 parts of organic acids. The extracted oils were then subjected to a stabilizing treatment to eliminate the peroxides present. Two hundred sixty parts of 3% sodium hydroxide was added to the extracted oils and the resulting mixture slowly distilled for about 16 hours until more than half of the reaction mixture had distilled over. The distillate and the residual reaction mixture were then recombined, the aqueous layer removed and the oils washed with water and then dried over anhydrous sodium sulfate. The stabilized oils were then submitted to fractional distillation at a pressure of 25 mm. of mercury. The forerun consisted of unreacted p-cymene and there was obtained at 120°–121° C. a fraction consisting of 125 parts of $a,a$-dimethyl-p-methylbenzyl alcohol and p-methylacetophenone, 90% of this fraction being $a,a$-dimethyl-p-methylbenzyl alcohol.

*Example 2*

Six hundred three parts of p-cymene of 99% purity and 900 parts of water in which 6 parts of potassium permanganate had been dissolved were placed in an apparatus similar to that used in Example 1. The current of air, however, was introduced through a nozzle with a large number of very small holes in order to disperse the air as very fine bubbles. The oxidation was carried out at room temperature until the refractive index of the oily layer rose to 1.5070 (20° C.). The temperature then was raised to 75°–80° C., greatly increasing the speed of the reaction. When a refractive index of 1.5202 (20° C.) was reached, the reaction was terminated. The oily and aqueous layers were separated and the oily layer extracted several times with 4% sodium hydroxide and then with water. The alkaline extractions were acidified to obtain 130 parts of acids, mainly cumic. The extracted oils were then stabilized as in Example 1 by distillation in the presence of 8% sodium hydroxide for about 8 hours. The stabilized oils then were fractionally distilled at a pressure of 25 mm. of mercury. In this way 226 parts of a fraction boiling at 120°–121.5° C. and containing about 93% $a,a$-dimethyl-p-methylbenzyl alcohol and 7% p-methylacetophenone was recovered.

*Example 3*

Six hundred three parts of p-cymene (99%) 900 parts of 2% aqueous sodium hydroxide, and 3 parts of activated carbon (Darco) were placed in a reaction vessel similar to that used in Example 1. A strong stream of air was introduced through the inlet tube so that a fine dispersion of the four phases resulted. The reaction mixture was heated to 75°–88° C. When the refractive index of the oily layer reached 1.5073 (20° C.), the oxidation was terminated. The aqueous and oily layers were separated and the oily layer extracted several times with 2% sodium carbonate. The sodium carbonate extracts were combined with the original aqueous alkaline layer and the combined aqueous material was acidified with 25% sulfuric acid to precipitate 58 parts of organic acids, mainly cumic.

The extracted oils contained about 21% $a,a$-dimethyl-p-methylbenzyl hydroperoxide. The peroxides were eliminated by subjecting the oily layer to slow distillation in the presence of 300 parts of 4% sodium hydroxide. When the peroxide content reached 1% as determined by the amount of iodine liberated upon adding a sample of the oil to acidified potassium iodide, the distillation was completed. The distillate and residue were then combined, the aqueous layer removed, the oils washed with water and then dried over anhydrous sodium sulfate. The oils were then fractionally distilled in a packed column at 25 mm. of mercury to give 218 parts of a fraction boiling at 120.5°–121.5° C. and consisting of 90% $a,a$-dimethyl-p-methylbenzyl alcohol and 10% p-methylacetophenon. The forerun of unchanged p-cymene also was recovered.

*Example 4*

Four hundred two parts of p-cymene, 450 parts of 2% aqueous sodium hydroxide, and 2 parts of potassium permanganate were placed in an apparatus similar to that used in Example 1. The oxidation was carried out by passing air through the reaction mixture at a temperature of 89°–95° C. When the refractive index reached 1.4980 (20° C.), the oxidation was terminated and the reaction mixture worked up similarly to that in Example 3. There were recovered 15 parts of cumic acid and 130 parts of a mixture consisting of about 90% $a,a$-dimethyl-p-methylbenzyl alcohol and about 10% p-methylacetophenone.

*Example 5*

Three hundred thirty-five parts of p-cymene and 250 parts of 4% aqueous sodium hydroxide were charged into a steel apparatus similarly equipped to that used in Example 1. The reaction vessel was heated by means of an oil bath and when the oil bath temperature reached 94°–101° C., air was run through the reaction mixture until the refractive index of the oxidized cymene layer rose to 1.5092 (20° C.). The aqueous and oily phases were worked up as in Example 3. In so doing, the peroxide content of the oily layer was reduced from 33% to about 2%. There were obtained 36.9 parts of acids, of which about two-thirds was cumic, and 167 parts of a mixture consisting of 88% $a,a$-dimethyl-p-methylbenzyl alcohol and 12% p-methylacetophenone.

*Example 6*

One thousand parts of cumene of 98% purity (refractive index at 20° C., 1.4902) and 500 parts of water in which 10 parts of potassium permanganate had been dissolved were placed in an apparatus similar to that used in Example 1. Air was passed through the reaction mixture at 40°–55° C. and when the refractive index of the oily layer reached 1.5140 (20° C.) the reaction was terminated. The reaction mixture was separated into an oily layer and an aqueous layer, and it was found that the oily layer consisted of 652 parts, indicating some loss due to evaporation. The oily layer was stabilized by adding 500 parts of 4% sodium hydroxide and distilling the mixture with agitation to obtain 491 parts of steam-volatile oils. These oils then were fractionally distilled using an original pressure of 50 mm. of mercury during removal of the unchanged cumene and a final pressure of 25 mm. of mercury during the removal of 337 parts of a mixture boiling at 98°–106° C. and consisting of about 60% $\alpha,\alpha$-dimethylbenzyl alcohol and about 40% acetophenone. From the aqueous alkali solution remaining after stabilization there was obtained 3.1 parts of acidic material having a melting point of 103°–105° C.

*Example 7*

One thousand parts of cumene, 500 parts of 2% aqueous sodium hydroxide, and 5 parts of activated carbon were placed in an apparatus similar to that used in Example 1. The air oxidation was carried out at temperatures of 65°–90° C. Alkaline conditions in the reaction mixture were maintained by twice adding 20 parts of 50% sodium hydroxide. During the reaction the hydroperoxide content of the oxidized oil was determined by the standard iodine liberation method. As the reaction progressed, the hydroperoxide content rose to 23.5%, thereafter gradually decreasing to 18.2%. The final refractive index of the oily layer was 1.5117 (20° C.). The aqueous alkaline layer was acidified with 12% sulfuric acid and 7.3 parts of acidic material recovered. Of the 846 parts of oxidized oil, 786 parts was subjected to the stabilization treatment shown in Example 6. Six hundred ninety-nine parts of steam distillable material was obtained and this material, as well as the residue from the steam distillation, was individually fractionated in a Fenske packed column at 50 mm. of mercury pressure. In addition to 172 parts of unreacted cumene and 30 parts of high-boiling distillation residue, 435 parts of a fraction, distilling in the range of 117°–123° C., and consisting of about 74% $\alpha,\alpha$-dimethylbenzyl alcohol and about 26% acetophenone was recovered.

*Example 8*

One thousand parts of crude diisopropylbenzene, 10 parts of activated carbon, and 500 parts of 2% aqueous sodium hydroxide were placed in an apparatus similar to that used in Example 1. Air was passed through the well-agitated mixture at a rate of 0.5 to 1.0 cubic foot per hour per pound of diisopropylbenzene. The temperature was maintained at 60°–80° C. and the alkali content of the aqueous layer checked from time to time. Ten parts of 50% aqueous sodium hydroxide was added three times to replace the caustic consumed. The final refractive index was 1.5168 (20° C.) and the peroxide content 27%.

The oily product was stabilized by steam distillation in the presence of 400 parts of 8% sodium hydroxide. Of 1000 parts of product, about 60% was steam volatile. The steam-volatile portion contained about 20% of unreacted diisopropylbenzene, about 70% of $\alpha,\alpha$-dimethyl-p-isopropylbenzyl alcohol and about 10% of p-isopropylacetophenone. The nonvolatile residue from the steam distillation contained about 50% crystalline dihydric alcohols, mainly $\alpha,\alpha,\alpha',\alpha'$-tetramethyl-p-xylylene dialcohol, and about an equal amount of a viscous liquid, mainly p-($\alpha$-hydroxyisopropyl) acetophenone.

*Example 9*

One thousand parts of diisopropylbenzene and 500 parts of 2% aqueous sodium hydroxide were oxidized with air under the same conditions used in Example 8. In addition to determining the refractive index of the oils and the alkali content of the aqueous phase, the peroxide content also was determined periodically. When the latter reached the value of 43.8%, about 500 parts of the oils (refractive index at 20° C., 1.5043) was removed and replaced by fresh diisopropylbenzene and the oxidation continued. Alkali was added when necessary and the oxidation stimulated by the addition in turn of (a) 10 parts of activated carbon, (b) about 36 parts of isopropyl ether, and (c) 39 parts of butyl ether. The final refractive index was 1.5230 (20° C.) and the peroxide content 8%.

The crude oxidation product was cooled to 3° C., resulting in the separation of about 10% crystalline dihydric alcohols. The residue was steam-distilled over 20 parts of sodium carbonate, the distillate amounting to slightly less than 45% and the residue to slightly more than 45% of the crude product. The steam-volatile portion contained small amounts of unchanged diisopropylbenzene, but the main constituents were $\alpha,\alpha$-dimethyl-p-isopropylbenzyl alcohol and p-isopropylacetophenone. From the steam-distillation residue, another 15% of dihydric alcohols was obtained by crystallization on cooling. The remaining viscous liquid analyzed 12.1% carbonyl and 11.1% hydroxyl, indicating that this product consists of about 77% p-($\alpha$-hydroxyisopropyl) acetophenone and about 23% diols.

*Example 10*

Five thousand two hundred thirty-five parts of p-cymene of 99% purity and 2415 parts of 2% aqueous sodium hydroxide were placed in an apparatus consisting of a steel pot with a glass pipe attached to its top. The steel pot was charged with the alkali solution and the glass pipe with the cymene. A two-fluid spray nozzle was placed in the center of the steel pot at the interface of the two liquids and was operated by air from a compressed air line. The alkali solution was pumped from the bottom of the steel pot into the nozzle. The nozzle produced a fine dispersion of air and alkali solution in the cymene layer. The temperature was controlled by means of two heating coils, one around the steel pot and another around the glass pipe. The oxidation was started by the addition of 100 parts tert-butyl hydroperoxide and continued at a temperature of 67°–73° C. until the refractive index of the oily layer reached 1.5050 (20° C.). A total of 281 parts sodium hydroxide was added in the course of the oxidation to maintain the alkalinity of the aqueous layer. The oily and alkali layers were separated. The alkali layer was acidified to give 475 parts of almost pure cumic acid. The oily layer was stabilized as in Example 1. The stabilized oils then were fractionally distilled at a pressure of 25 mm. of mercury. In this way, 1540 parts of a fraction boiling at 120°–121.5° C. and containing 95% $\alpha,\alpha$-dimethyl-p-methylbenzyl alcohol and 5% p-methylacetophenone was recovered.

*Example 11*

One thousand parts of p-cymene of 99% purity, 50 parts of oxidized p-cymene from a previous run, and 500 parts of water in which 20 parts cobaltous nitrate and 0.5 part sodium hydroxide had been dissolved were placed in an apparatus similar to that used in Example 1. The oxidation was carried out with air at 50°–60° C. until the refractive index of the oily layer rose to 1.5162 (20° C.). The oily and aqueous layers were separated and the oily layer extracted several times with concentrated sodium bicarbonate and then with water. The alkali extractions were acidified to obtain 189 parts of acids, mainly cumic. The extracted oils were then stabilized as in Example 1, and the stabilized oils then were fractionally distilled at a pressure of 25 mm. of mercury. In this way, 380 parts of a fraction boiling at 120°–121.5° C. and containing about 90% $\alpha,\alpha$-dimethyl-p-methylbenzyl alcohol and about 10% p-methylacetophenone was recovered.

*Example 12*

Nine hundred parts of commercial sec-butylbenzene (refractive index at 20° C., 1.4920), 300 parts of 2% aqueous sodium hydroxide, 130 parts of oxidized sec-butylbenzene (hydroperoxide content, 15.5%) from a previous run, 3 parts of potassium stearate and 6 parts of solid sodium hydroxide were placed in an apparatus similar to that used in Example 1. The mixture was agitated and heated to 90° C., and oxygen was introduced at the rate of 8.89 liters per hour per kilogram of sec-butylbenzene. Samples were taken periodically from both the oily and aqueous phases. The oily phase samples were used in determining the hydroperoxide content by the standard iodine liberation method and in measuring the refractive index. The aqueous phase samples were titrated to determine the alkali content of the reaction mixture, and solid sodium hydroxide added to the latter whenever necessary to replace the alkali consumed. The refractive index of the oily phase gradually increased to 1.5010 (20° C.), at which point the hydroperoxide content was 9.0%. To decompose the hydroperoxide 9 parts of activated carbon then were added to the reaction mixture and the oxidation continued, the addition of activated carbon being repeated every 24 hours until the oxidation was stopped when the oily phase had a refractive index of 1.5060 (20° C.) and a hydroperoxide content of 6.9%. The latter value subsequently dropped to 5.4%. Upon separation of the aqueous and oily phases, 977 parts of the latter was obtained, which after drying was fractionated in a packed column of about 20 theoretical plates at a pressure of 25 mm. of mercury per square inch. The forerun consisted of 512 parts of unreacted sec-butylbenzene. There then were obtained a middle fraction of 105 parts of acetophenone, and a fraction distilling at 116–119° C. and containing 225 parts of $\alpha$-ethyl-$\alpha$-methylbenzyl alcohol.

*Example 13*

Twelve hundred parts of cumene, 400 parts of 2% aqueous sodium hydroxide and 18 parts of $\alpha,\alpha$-dimethylbenzyl hydroperoxide were placed in an apparatus similar to that used in Example 1. The mixture was agitated and heated to 90° C., and oxygen was introduced at the rate of 10 liters per hour per kilogram of cumene for a period of 38 hours. Upon completion of the oxidation the aqueous and oily phases were separated. The oily phase constituted 1420 parts and contained 63.4% $\alpha,\alpha$-dimethylbenzyl hydroperoxide.

*Example 14*

The process of Example 13 was repeated using 1200 parts of cumene, 400 parts of 3% aqueous sodium carbonate, 36 parts of $\alpha,\alpha$-dimethylbenzyl hydroperoxide, a temperature of 90° C., an oxygen input rate of 10 liters per hour per kilogram of cumene, and a reaction time of 54 hours. There was obtained 1454 parts of an oily phase containing unreacted cumene and 61.9% $\alpha,\alpha$-dimethylbenzyl hydroperoxide.

*Example 15*

Nine hundred parts of cumene was oxidized as in Example 13 using 300 parts of 2% aqueous sodium bicarbonate, 27 parts of $\alpha,\alpha$-dimethylbenzyl hydroperoxide, oxygen at the rate of 10 liters per hours per kilogram of cumene, a temperature of 90° C. and a reaction period of 32.5 hours. The resulting oily phase constituted 1058 parts by weight and contained 55.4% $\alpha,\alpha$-dimethylbenzyl hydroperoxide.

*Example 16*

Following the procedure of Example 13, 1200 parts of diisopropylbenzene was oxidized in the presence of 400 parts of 2% aqueous sodium hydroxide, 36 parts of $\alpha,\alpha$-dimethyl-p-isopropylbenzyl hydroperoxide and 4 parts of stearic acid. Oxygen was introduced at the rate of 10 liters per hour per kilogram of diisopropylbenzene. The reaction temperature was 90° C. After 18 hours the hydroperoxide content of the oily phase was 54.9%. The oxidation was continued for a total of 90 hours, then the aqueous phase was separated from the remaining material, which constituted 1481 parts by weight. On cooling the latter to room temperature partial crystallization occurred. Separation by filtration gave 1247 parts of an oily phase containing 62.2% $\alpha,\alpha$-dimethyl-p-isopropylbenzyl hydroperoxide (refractive index at 20° C., 1.513; boiling point, 81° C. at 0.25 mm. Hg (sq. cm.), and 234 parts of crystalline material which contained 87% $\alpha,\alpha,\alpha',\alpha'$-tetramethyl-p-xylylene dihydroperoxide. The latter on being recrystallized twice from methanol had the following characteristics: melting point, 147–152° C. (with decomposition); analysis (found): C, 63.88%; H, 8.05%; analysis (calculated): C, 63.70%; H, 8.02%. The small, needle-shaped crystals of the dihydroperoxide exhibited a fairly high birefringence.

The oxidation process in accordance with this invention is quite versatile in that it may be carried out to produce primarily alcohols such as $\alpha,\alpha$-dimethylbenzyl alcohol, or hydroperoxides such as $\alpha,\alpha$-dimethylbenzyl hydroperoxide, or mixtures of the two. The broad conditions under which the process may be carried out represent a combination which has not been known previously in the art, but it is possible by selection of preferred conditions within the broad ranges to obtain a preponderance of the particular product desired. Generally speaking, the alcohols are best produced by effecting the oxidation at relatively low temperatures in the presence of a catalyst dissolved in liquid water as the aqueous medium, whereas the hydroperoxides are obtained in highest yields when the temperature is maintained at a high level within the broad range, and the oxidation is carried out in the absence of a catalyst and using an aqueous alkali as the aqueous medium.

Although the examples have set forth the use of p-cymene, cumene, diisopropylbenzene and sec-butylbenzene as the materials to which the oxidation has been applied, other compounds having the structural formula previously set forth may be utilized. The main requirement for the compounds which may be oxidized in accordance with this invention is the presence of a tertiary carbon atom carrying a hydrogen atom as its fourth substituent. As shown by the structural formula, the carbon atom is tertiary because it is directly connected to three other carbon atoms, contained in the groups represented by $R_1$, $R_2$ and Ar. The aryl and alkaryl groups need not be derived from benzene as is the case of p-cymene, cumene, diisopropylbenzene and sec-butylbenzene. Compounds containing aromatic nuclei such as those derived from naphthalene, anthracene and phenanthrene also are operable, but these compounds, being solids, must be dissolved in a suitable solvent, such as benzene, during the liquid phase oxidation. In addition the aryl group may be substituted with alkyl groups, as illustrated by the methyl group in p-cymene, and the groups may, for example, be methyl, ethyl, propyl, isopropyl, butyl, isobutyl, secondary butyl, tertiary butyl, and the like. The alkyl groups as represented by $R_1$ and $R_2$ in the structural formula also need not be limited to the methyl groups of cymene, cumene and diisopropylbenzene. Other alkyl groups such as those previously indicated as suitable for substitution in the aryl groups may be utilized, and $R_1$ and $R_2$ may be either the same or different. Relative to the p-cymene used in accordance with this invention, this material may be either pure cymene or one containing varying amounts of terpenes and p-menthane; however, in order to obtain high yields of cumic acid and liquid products having a high content of $\alpha,\alpha$-dimethyl-p-methylbenzyl alcohol or $\alpha,\alpha$-dimethyl-p-methylbenzyl hydroperoxide, high-grade p-cymene should be utilized.

Relative to the aqueous medium presen in the reaction mixture, the ratio of this aqueous medium to the compound being oxidized may vary within wide limits from about 1:10 to about 10:1, although it is preferable to work in the range of about 1:3 to about 3:1. When the aqueous medium is an aqueous alkali, it may consist of a solution of an alkali metal hydroxide, such as sodium, potassium, lithium, and the like, or of an alkali earth metal hydroxide, such as calcium or barium. In place of these inorganic bases, strong organic bases such as tetraalkylammonium hydroxides, for example, trimethylbenzylammonium hydroxides, for example trimethylbenzylammonium hydroxide, may be used. Also operable are inorganic carbonates and bicarbonates, such as sodium carbonate and bicarbonate, and alkali metal salts of weak organic acids. These alkalies, in the form of their aqueous solutions, are preferred when the oxidations are carried out mainly to obtain high yields of hydroperoxides.

The concentration of the alkaline solution will depend upon the particular alkali used and may vary within wide limits. For instance, sodium hydroxide, sodium bicarbonate or sodium carbonate may be used in solutions varying from about 1% to about 35%, but it is preferable to use concentrations of about 2% to about 8%. When using such preferable concentrations of these alkalies, the preferred ratio of the aqueous alkali to the compound being oxidized ranges from about 1:2 to about 1:6, with the optimum ratio being about 1:4 by volume. In the case of p-cymene oxidation in particular, if low ratios of aqueous alkali to p-cymene are combined with low alkali concentrations, the total available alkali is low, and, since the oxidation of p-cymene may result in the formation of organic acids, these may completely neutralize the alkali present. It is, therefore, necessary to check from time to time the alkalinity of the aqueous medium and to introduce fresh alkali, preferably in a more concentrated form, in order to keep the alkali concentration at nearly the same level.

The examples have set forth the use of air and molecular oxygen as the oxygen-containing gas, but the oxygen may be furnished also in mixtures of oxygen with nitrogen or other inert gases. Oxygen when used alone may be in the form of pure or commercial oxygen. Air may be utilized either as it is readily available or as humidified up to the saturation point. Furthermore, it is advisable to wash the air with a caustic solution in order to remove carbon dioxide.

The oxidation may be carried out either in the presence or absence of a catalyst to produce the alcohols and hydroperoxides of this invention. The presence of a catalyst, however, favors alcohol production, whereas the absence of a catalyst aids in hydroperoxide production. Due to the fact that the reaction mixture contains both oily and aqueous phases, a wide variety of catalysts is available. Water-soluble catalysts may be used, for example, such as potassium permanganate, manganese acetate, ferrous sulfate, cobaltous nitrate, cobaltous acetate, and the like. These catalysts are preferred when liquid water is the medium and it is desired to produce alcohols as the primary products. In case the aqueous medium is alkaline, these salts are, of course, converted to the corresponding hydroxides, and it is possible to use directly the hydroxides and oxides of these metals as catalysts.

Oil-soluble catalysts also may be used, for instance, catalysts which are soluble in cymene, cumene, diisopropylbenzene and sec-butylbenzene. Exemplary are manganese-butyl phthalate and manganese linoleate. Those oxidized oils obtained according to the process of this invention and containing appreciable amounts of hydroperoxides also are oil-soluble and are therefore useful in initiating the oxidation reaction by relieving inhibitions caused by harmful impurities. These oxidized oils, however, do not act as actual catalysts and are therefore highly desirable initiators for those oxidations in which it is desired to obtain optimum yields of hydroperoxides. These hydroperoxide-rich oils may be used in amounts varying from about 1% to about 50% of the hydrocarbon present, but a preferable range is from about 3% to about 20%.

One further type of catalyst may be utilized; namely, that which is insoluble in both the aqueous and oily phases. An example of such a catalyst is activated carbon. This type is particularly suitable when the oxidation is carried out in alkaline medium and conversion of the starting material to an alcohol is preferred.

The amount of the catalyst will depend somewhat upon the nature of the catalyst, the chemical composition, the temperature of oxidation, and the nature of the product desired. Generally, however, the catalysts may be used in amounts varying from about 0.2% to about 10% based upon the hydrocarbon, and a range between about 0.5% and about 3% is preferable. The amount of catalyst is influential in determining the type of reaction product obtained. Even though the absence of a catalyst is preferred in hydroperoxide production, high yields of hydroperoxides may be effected providing the amount of catalyst is maintained at a minimum. Contrarily, maximum amounts of catalyst insure a preponderance of alcohols. Intermediate amounts within the broad range of catalyst concentration produce varying amounts of alcohols and hydroperoxides.

The temperature at which the oxidation is carried out depends on other conditions, particularly on the presence or absence of a catalyst and the nature and amount of the catalyst. When no catalyst is used, the reaction is too slow at temperatures below about 20° C., and it is advisable in such a case to work at a temperature between about 45° C. and about 95° C., preferably between about 60° C. and about 95° C. These temperature ranges are particularly applicable to the production of hydroperoxides. The reaction proceeds at a convenient rate at a temperature between about 20° C. and about 95° C. when a catalyst is used, and a preferable range is from about 25° C. to about 60° C. Under such conditions the formation of alcohols is favored. All of the temperatures refer to temperatures as measured at atmospheric pressure. The process of this invention may be carried out under pressure, however, and in such cases the reaction temperatures may be higher than previously indicated.

Since the reaction is heterogeneous, suitable agitation is necessary, especially in the production of hydroperoxides. It is particularly important to bring the air, oxygen, or other oxygen-containing gas into intimate contact with the liquid phases, and this may be effected by using high-speed stirrers, suitable nozzles, porous plates or their combinations.

The course of the reaction may be followed by taking samples at intervals and determining the refractive index of the oily layer. In the oxidation of cumene, for example, refractive index values between about 1.5020 and about 1.5145 indicate that about 40% to about 80% of the original organic material has been oxidized, and the reaction then is advisably interrupted. The refractive indices, however, depend somewhat on three factors: (1) the nature of the hydrocarbon, (2) the medium used; i. e., liquid water or aqueous alkali, and (3) the nature of the desired end product. Of these factors, (1) is less decisive than the others. Quite important, however, is (2), particularly in case acids are formed, for example, in the oxidation of p-cymene. If aqueous alkali is used as the medium, any acids formed will dissolve therein and the refractive index will be lower, equal conversions considered, than will be the case wherein liquid water is utilized as the medium. In the latter, the acids formed dissolve in the oily phase and the refractive index may then be as high as about 1.5230. Finally, (3) is decisive when the hydrocarbon has two tertiary carbon atoms, as in diisopropyl-benzene, and there is a choice in end products between a mono- and a dihydric alcohol. In producing a monohydric alcohol, the oxidation is interrupted on reaching a relatively low refractive index, while the production of a dihydric alcohol requires a higher value. In either case, the refractive index also may be influenced by the medium used.

Conversions from about 40% to about 80% can easily be obtained in the process of this invention, but under the conditions previously set forth as preferable for the formation of alcohols conversions higher than about 40–50% are not desirable. When p-cymene is oxidized to $\alpha,\alpha$-dimethyl-p-methylbenzyl alcohol, for example, this alcohol may be further oxidized to less desirable products such as p-toluic and terephthalic acids. When desiring alcohol production, another undesirable effect of conversions higher than 40%–50% is that increasing proportions of the alcohol will be converted to a ketone of one less carbon atom. For example, in the oxidation of cumene, $\alpha,\alpha$-dimethylbenzyl alcohol produced loses a methyl group by further oxidation to give acetophenone. Hydrocarbons having two tertiary carbon atoms such as diisopropylbenzene may yield, depending upon the extent of the oxidation, a monohydric alcohol, a dihydric alcohol or approximately equal quantities of the two. In any case, the products may contain appreciable amounts of ketones formed by further oxidation of the alcohols, and in this way the dihydric alcohols usually contain hydroxy ketones. The monohydric alcohols and ketones are usually liquids and the dihydric alcohols are usually crystalline solids. The hydroxy ketones are viscous liquids. When the oxidation is effected under the conditions preferable for hydroperoxide formation, however, the conversion may be carried up to about 80%, since it is not until this conversion value is exceeded that increasing amounts of alcohol and ketone are formed.

In order to recover the reaction products, the aqueous layer is first separated and removed. In case liquid water is used as the aqueous medium, the resulting aqueous layer may contain a small amount of organic acid salts which may be precipitated by the addition of some inorganic acid such as sulfuric or hydrochloric. In case the aqueous medium used during the reaction is an aqueous alkali, the resulting aqueous layer also contains salts of organic acids, such as cumic, which may be precipitated by inorganic acids. Sulfur dioxide also is useful as a precipitant, since it exerts a bleaching effect and, therefore, removes some of the dark color found in the aqueous layer. The precipitated organic acids may be filtered and washed free from inorganic acids and salts and then may be purified by recrystallization from alcohol of varying water content, fractional precipitation, or by fractional extraction with alkalies such as sodium bicarbonate, sodium carbonate or sodium hydroxide, followed by re-precipitation with inorganic acids.

The oxidized oils may also contain some organic acids which may be removed by extraction with a dilute alkali such as sodium hydroxide, sodium carbonate or sodium bicarbonate. The concentration of these alkalies may range from about 1% to about 10%, but it is preferable to use solutions having concentrations from about 2% to about 5%. By working with dilute alkalies and carrying out the extraction in several steps, it is possible to bring about fractional separation of the acids, and the aqueous extracts thus obtained may be acidified to recover the organic acids. In the case of cumene or diisopropylbenzene, the acid formation is slight.

The oily material remaining after the alkaline extraction may comprise a mixture of unreacted starting material, alcohols, ketones, hydroxy ketones and hydroperoxides in varying amounts depending on how the oxidation was carried out. For instance, after the alkaline extraction of the oils resulting from the oxidation of p-cymene, the oils may consist of a mixture of unreacted p-cymene, $\alpha,\alpha$-dimethyl-p-methylbenzyl alcohol, p-methylacetophenone and $\alpha,\alpha$-dimethyl-p-methylbenzyl hydroperoxide. In case the oxidation is carried out primarily to produce an alcohol but the product nevertheless contains an appreciable amount of the relatively unstable hydroperoxide, the oils must be stabilized before fractional distillation at commercially feasible pressures can be safely applied to isolate the alcohol. The stabilization is essentially a treatment for the decomposition of hydroperoxides. It may consist in a controlled heat-treatment, but it is preferable to utilize the method shown by the examples; namely, the slow distillation of the oxidized oils with aqueous caustic solutions having a concentration from about 2% to about 18%, preferably from about 5% to about 12%. In addition to the aqueous caustic shown in the examples, there generally may be used aqueous solutions of the hydroxides, carbonates and bicarbonates of the alkali metals. By this method, $\alpha,\alpha$-dimethyl-p-methylbenzyl hydroperoxide, for example, is converted mainly to $\alpha,\alpha$-dimethyl-p-methylbenzyl alcohol, thereby increasing the yield of this alcohol. Furthermore, the aqueous alkali solution hinders any dehydration of such alcohols.

After stabilization, the distillate is recombined with the undistilled portion and the oils are separated from the aqueous caustic layer. The oils then are washed with water and the wash liquids combined with the caustic layer. By acidifying the resulting aqueous mixture with a dilute mineral acid, further amounts of organic acids, including cumic, may be recovered. The washed oils then are submitted to fractional distillation under reduced pressure (from about 10 to about 100 mm. of mercury) in an efficient column. Packed columns with an efficiency of about 15 to about 20 theoretical plates will give suitable fractionation. For instance, the oils derived from p-cymene may be distilled to give fractions containing from about 80% to about 95% $\alpha,\alpha$-dimethyl-p-methylbenzyl alcohol and from about 5% to about 20% p-methylacetophenone. The unreacted starting material may also be recovered as a forerun during the distillation and may be used in subsequent oxidation runs.

In the case of the oils derived from materials such as cumene and diisopropylbenzene, the monohydric alcohols contained in the stabilized oils may be separated from the ketones and unreacted hydrocarbons by fractional distillation. In this respect, conditions are often more favorable than in the recovery of p-cymene oxidation products, since, in the latter, the vapor pressure-temperature curves of $\alpha,\alpha$-dimethyl-p-methylbenzyl alcohol and p-methylacetophenone are sufficiently close together that even columns of high efficiency cannot effect good separation. The oxidation products of cumene ($\alpha,\alpha$-dimethylbenzyl alcohol and acetophenone) can be separated in a packed column of an efficiency of about 40–60 theoretical plates.

When the oxidation reaction is carried out for the purpose of preparing a product having a high hydroperoxide content, the first step in the recovery of the reaction products is separation of the aqueous layer. The oily layer then may be washed with dilute aqueous alkali and used either in the wet, slightly cloudy state for various purposes, or after clarification and drying by filtration. If a highly concentrated hydroperoxide is desired, the crude product may be stripped of unreacted hydrocarbon by distallation at pressures of about 1 to about 5 millimeters of mercury per square centimeter. The hydroperoxide itself may safely be distilled at temperatures below about 100° C., this requiring the use, however, of pressures of about 0.01 to about 1.0 millimeter. $\alpha,\alpha$-Dimethylbenzyl hydroperoxide, for example, may be distilled at 60° C./0.2 mm. and at 68° C./0.3 mm. pressure. Another method of separating the hydroperoxide from the crude oily product involves precipitation of the hydroperoxide with a concentrated aqueous solution (25–40%) of sodium hydroxide. The precipitate is crystalline, and on the basis of analysis is a compound of the hydroperoxide with sodium hydroxide and water. The precipitate of $\alpha,\alpha$-dimethylbenzyl hydroperoxide, for example, consists of one mole of the hydroperoxide, one mole of sodium hydroxide and two moles of water.

The oxidation according to this invention apparently proceeds by a peroxide mechanism. Using cumene as an example, when this compound is oxidized with molecular oxygen, a hydroperoxide is formed on the tertiary carbon of the isopropyl group. In the absence of a catalyst and in the presence of an aqueous alkali medium the hydroperoxide is quite stable, and its concentration increases to give a reaction product high in hydroperoxide content. In the presence of a catalyst, however, the hydroperoxide decomposes mainly to the corresponding alcohol, although it may also aid in the oxidation of other alkyl groups present in the molecule, if such groups are present, as the methyl group in p-cymene. That the oxidation reaction follows a chain mechanism is shown by the existence of an induction period, by cases of inhibition, and by the fact that both may be eliminated by the addition of hydroperoxide-rich oils from a previous oxidation run.

The use of an aqueous medium in the oxidation of compounds such as p-cymene and cumene by an oxygen-containing gas is advantageous over previous procedures for several reasons. The use of an aqueous medium makes it possible to utilize water-soluble catalysts such as potassium permanganate. The aqueous medium also favors hydroperoxide formation on the tertiary carbon. This is particularly true when aqueous alkali is used as the medium, since the alkali stabilizes the hydroperoxide. The use of aqueous alkali therefore aids in the preparation of high yields of the tertiary hydroperoxides. Furthermore, an aqueous medium slows down the decomposition of the hydroperoxides formed during the oxidation so that side reactions are suppressed and the excess oxygen is utilized for the formation of further amounts of the primary oxidation products. In the oxidation of p-cymene, for instance, to produce $\alpha,\alpha$-dimethyl-p-methylbenzyl alcohol, the amount of p-methylacetophenone formed is reduced due to the presence of the aqueous phase. The hydroperoxide formed by the oxidation of p-cymene on the tertiary carbon is relatively unstable and is subject to decomposition in the course of the oxidation or during stabilization, the final products depending upon the manner of this decomposition. Due to the presence of the aqueous phase, the decomposition of the hydroperoxide is retarded and the oxygen liberated during the decomposition is, therefore, used for further oxidation of fresh cymene molecules rather than further oxidation of the $\alpha,\alpha$-dimethyl-p-methylbenzyl alcohol to yield p-methylacetophenone. All in all, the oxidation in an aqueous medium results in a more orderly process leading almost exclusively to the main reaction products.

The products obtained according to this invention find various commercial applications. For example, $\alpha,\alpha$-dimethyl-p-methylbenzyl alcohol is used in the essential oil industry as a perfume base for soaps. This compound also is an efficient frothing agent in the flotation of copper, zinc, and lead sulfide ores. $\alpha,\alpha$-Dimethylbenzyl alcohol has similar commercial applications. Cumic acid in the form of its alkali salts may be used in the separation of potassium and sodium salts by flotation, and esters of cumic acid exhibit a plasticizing effect in synthetic rubbers. The dihydric alcohols such as those derived from diisopropylbenzene also are efficient frothing agents in heavy metal, especially lead sulfide, ore flotations. All of the alcohols are good wetting-out agents. The steam-volatile ketones obtained as by-products from most of these hydrocarbons have pleasant odors and may be used as perfume bases for soaps. The hydroperoxides, such as α,α-dimethylbenzyl hydroperoxide, for example, are excellent catalysts for the polymerization of vinyl, vinylidene and vinylene compounds. They also are useful in rubber reclaiming, in flotation, and in kier boiling, bleaching and other textile operations.

This application constitutes a continuation-in-part of our application for United States Letters Patent, Serial No. 614,433, filed September 4, 1945, now abandoned.

What we claim and desire to protect by Letters Patent is:

1. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 20° C. and about 95° C. in the presence of an aqueous medium selected from the group consisting of liquid water and an aqueous alkali.

2. The process of oxidizing an alkyl-substituted aromatic organic compound having the structural formula

in which $R_1$ and $R_2$ represent alkyl groups and Ar represents an aryl group, which process comprises passing, with intimate contact, an oxygen-containing gas through said organic compound in the liquid phase at a temperature between about 20° C. and about 95° C. in the presence of an aqueous medium selected from the group consisting of liquid water and an aqueous alkali.

3. The process of oxidizing an alkyl-substituted aromatic organic compound having the structural formula

in which $R_1$ and $R_2$ represent alkyl groups and Ar represents an alkaryl group, which process comprises passing, with intimate contact, an oxygen-containing gas through said organic compound in the liquid phase at a temperature between about 20° C. and about 95° C. in the presence of an aqueous medium selected from the group consisting of liquid water and an aqueous alkali.

4. The process of oxidizing an alkyl-substituted aromatic organic compound having the structural formula

in which $R_1$ and $R_2$ represent alkyl groups and Ar represents a phenyl group, which process comprises passing, with intimate contact, an oxygen-containing gas through said organic compound in the liquid phase at a temperature between about 20° C. and about 95° C. in the presence of an aqueous medium selected from the group consisting of liquid water and an aqueous alkali.

5. The process of oxidizing an alkyl-substituted aromatic organic compound having the structural formula

in which $R_1$ and $R_2$ represent alkyl groups and Ar represents a naphthyl group, which process comprises passing, with intimate contact, an oxygen-containing gas through said organic compound in the liquid phase at a temperature between about 20° C. and about 95° C. in the presence of an aqueous medium selected from the group consisting of liquid water and an aqueous alkali.

6. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 20° C. and about 95° C. in the presence of an aqueous medium selected from the group consisting of liquid water and an aqueous alkali, said aqueous medium containing an emulsifying agent.

7. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 20° C. and about 95° C. in the presence of liquid water.

8. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 25° C. and about 60° C. in the presence of liquid water.

9. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 20° C. and about 95° C. in the presence of an aqueous alkali.

10. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 20° C. and about 95° C. in the presence of an aqueous alkali, the concentration of the alkali being maintained by introduction of fresh alkali.

11. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 45° C. and about 95° C. in the presence of an aqueous alkali.

12. The process of oxidizing an alkyl-substituted aromatic organic compound having the structural formula

in which $R_1$ and $R_2$ represent alkyl groups and Ar represents a substituent selected from the group consisting of aryl and alkaryl groups, which process comprises passing, with intimate contact, an oxygen-containing gas through said organic compound in the liquid phase at a temperature between about 60° C. and about 95° C. in the presence of an aqueous alkali.

13. The process of oxidizing p-cymene which comprises passing, with intimate contact, an oxygen-containing gas through p-cymene in the liquid phase at a temperature between about 20° C. and about 95° C. in the presence of liquid water.

14. The process of oxidizing p-cymene which comprises passing, with intimate contact, air through p-cymene in the liquid phase at a temperature between about 25° C. and about 60° C. in the presence of liquid water in which potassium permanganate is dissolved.

15. The process of oxidizing cumene which comprises passing, with intimate contact, an oxygen-containing gas through cumene in the liquid phase at a temperature between about 20° C. and about 95° C. in the presence of an aqueous alkali.

16. The process of oxidizing cumene which comprises passing, with intimate contact, oxygen through cumene in the liquid phase at a temperature between about 20° C. and about 95° C. in the presence of aqueous sodium hydroxide.

17. The process of oxidizing cumene which comprises passing, with intimate contact, oxygen through cumene in the liquid phase at a temperature between about 45° C. and about 95° C. in the presence of aqueous sodium hydroxide.

18. The process of oxidizing cumene which comprises passing, with intimate contact, oxygen through cumene in the liquid phase at a temperature between about 60° C. and about 95° C. in the presence of aqueous sodium hydroxide.

19. The process of oxidizing diisopropylbenzene which comprises passing, with intimate contact, an oxygen-containing gas through diisopropylbenzene in the liquid phase at a temperature between about 20° C. and about 95° C. in the presence of an aqueous alkali.

20. The process of oxidizing diisopropylbenzene which comprises passing, with intimate contact, an oxygen-containing gas through diisopropylbenzene in the liquid phase at a temperature between about 20° C. and about 95° C. in the presence of aqueous sodium hydroxide.

21. The process of oxidizing diisopropylbenzene which comprises passing, with intimate contact, air through diisopropylbenzene in the liquid phase at a temperature between about 60° C. and about 95° C. in the presence of aqueous sodium hydroxide and suspended activated carbon.

22. The process of oxidizing sec-butylbenzene which comprises passing, with intimate contact, an oxygen-containing gas through sec-butylbenzene in the liquid phase at a temperature between about 20° C. and about 95° C. in the presence of an aqueous alkali.

23. As a new product, a tertiary diisopropylbenzene hydroperoxide.

24. As a new product, α,α-dimethyl-p-isopropylbenzyl hydroperoxide.

25. As a new product, α,α,α',α'-tetramethyl-p-xylylene dihydroperoxide.

EUGENE J. LORAND.
JOHN E. REESE.

REFERENCES CITED

The following references are of record in the file of this patent:

UNITED STATES PATENTS

| Number | Name | Date |
|---|---|---|
| 1,924,786 | Hartmann et al. | Aug. 29, 1933 |
| 2,120,672 | Mares | June 14, 1938 |
| 2,403,772 | Vaughan | July 9, 1946 |
| 2,430,864 | Farkas et al. | Nov. 18, 1947 |
| 2,447,794 | Brewer | Aug. 24, 1948 |

OTHER REFERENCES

Stephens: "Journal Amer. Chem. Soc.," vol. 48 (1926), pages 2920–2922.